US010817849B1

(12) United States Patent
Nicoll et al.

(10) Patent No.: US 10,817,849 B1
(45) Date of Patent: Oct. 27, 2020

(54) EFFICIENT SERVICE RACK SYSTEM

(71) Applicant: Lyft, Inc., San Francisco, CA (US)

(72) Inventors: Matthew James Vere Nicoll, Pleasanton, CA (US); Garfull Chan, Castro Valley, CA (US)

(73) Assignee: LYFT, INC., San Francisco, CA (US)

( * ) Notice: Subject to any disclaimer, the term of this patent is extended or adjusted under 35 U.S.C. 154(b) by 0 days.

(21) Appl. No.: 16/570,398

(22) Filed: Sep. 13, 2019

(51) Int. Cl.
*B65G 1/02* (2006.01)
*A47B 47/02* (2006.01)
*A47B 47/00* (2006.01)
*A47F 1/04* (2006.01)
*A47F 5/00* (2006.01)
*A47F 5/10* (2006.01)
*A47F 5/12* (2006.01)
*A47F 5/16* (2006.01)
*G06Q 10/00* (2012.01)
(Continued)

(52) U.S. Cl.
CPC ......... *G06Q 10/20* (2013.01); *A47B 47/0083* (2013.01); *A47B 47/021* (2013.01); *A47F 1/04* (2013.01); *A47F 5/0025* (2013.01); *A47F 5/108* (2013.01); *A47F 5/12* (2013.01); *B65G 1/023* (2013.01); *B65G 1/1371* (2013.01); *G07C 5/006* (2013.01); *G07C 5/008* (2013.01); *A47F 2005/165* (2013.01)

(58) Field of Classification Search
CPC ........ B65G 1/023; B65G 1/1371; B65G 1/02; B65G 1/026; B65G 1/14; B65G 1/06; D06F 93/00; D06F 93/005; A47B 47/0083; A47B 47/045; A47B 47/02; A47B 47/021; A47B 47/024; A47B 47/027; A47B 47/028; A47B 63/00; A47B 57/04; A47F 5/0093; A47F 1/04; A47F 1/00; A47F 1/125; A47F 5/0018; A47F 5/0025; A47F 5/0037; A47F 5/0043; A47F 5/108; A47F 5/12; A47F 5/16; A47F 2005/165; A47F 3/06; A47F 3/063; A47F 2003/066
USPC ..... 211/134, 150, 151, 191, 59.2, 10, 128.1, 211/133.1, 187; 414/267, 276, 331.06; 108/106, 107, 109, 147.12, 147.13, 108/147.15; 209/630
See application file for complete search history.

(56) References Cited

U.S. PATENT DOCUMENTS 1,666,074 A * 4/1928 Steinhilber .......... B65H 45/101
211/45
1,700,976 A * 2/1929 Bulman ................ A47F 5/0025
211/85.26
(Continued)

*Primary Examiner* — Jennifer E. Novosad
(74) *Attorney, Agent, or Firm* — Keller Jolley Preece

(57) ABSTRACT

A service rack system includes a service rack and one or more totes. Each of the one or more totes have a full indicator and a refill indicator. The service rack includes front, back, right, and left sides. The front side is directly opposite the back side. The service rack also includes a panel on each of the right and left sides, at least one supply rack angled towards the front side, and at least one return rack angled towards the back side. The at least one supply rack is constructed to support one or more columns of totes such that each column includes at least two totes. Each column of totes has a full state and a refill state. The full state includes at least two totes positioned such that the full indicator of one tote faces the front side. The refill state includes a tote positioned such that its refill indicator is directly adjacent the front side.

20 Claims, 14 Drawing Sheets

(51) Int. Cl.
*B65G 1/137* (2006.01)
*G07C 5/00* (2006.01)

(56) References Cited

U.S. PATENT DOCUMENTS

| | | | | |
|---|---|---|---|---|
| 1,895,535 A * | 1/1933 | Brecht | A47F 5/108 | 211/149 |
| 2,079,385 A * | 5/1937 | Ross | B07C 7/02 | 211/10 |
| 2,915,162 A * | 12/1959 | Umstead | A47F 1/087 | 193/27 |
| 3,055,293 A * | 9/1962 | Lariccia | A47F 1/087 | 101/44 |
| 3,126,101 A * | 3/1964 | Ketterjohn | A47B 57/06 | 211/190 |
| 3,465,897 A * | 9/1969 | Horn | A47B 53/02 | 211/151 |
| 3,497,073 A * | 2/1970 | Bartell | A47B 31/00 | 211/2 |
| 3,528,558 A * | 9/1970 | Williams | A47F 5/0025 | 211/59.2 |
| 3,700,114 A * | 10/1972 | Myers | A47B 57/045 | 211/150 |
| 3,900,112 A * | 8/1975 | Azzi | B65G 1/023 | 211/187 |
| 4,426,008 A * | 1/1984 | Olson | A47F 1/082 | 211/194 |
| 4,453,641 A * | 6/1984 | Rasmussen | A47F 1/12 | 211/151 |
| 4,775,057 A * | 10/1988 | Zingeser | A47F 7/28 | 206/366 |
| 4,790,707 A * | 12/1988 | Magretta | A47B 57/402 | 211/187 |
| 4,930,640 A * | 6/1990 | Edwards | A47F 7/0042 | 211/134 |
| 5,090,579 A * | 2/1992 | Major | A47B 57/20 | 211/126.1 |
| 5,119,942 A * | 6/1992 | McCullars | B07C 7/00 | 211/10 |
| 5,201,429 A * | 4/1993 | Hikosaka | B65G 1/1375 | 211/59.2 |
| 5,295,591 A * | 3/1994 | Slater | A47B 47/027 | 211/151 |
| 5,297,685 A * | 3/1994 | Ramey | G09F 7/00 | 211/41.15 |
| 5,577,622 A * | 11/1996 | Kapteyn | A47F 5/0025 | 211/133.1 |
| 5,590,794 A * | 1/1997 | Zachary | B07C 7/02 | 209/702 |
| 5,607,068 A * | 3/1997 | Coretti, Jr. | A47F 5/135 | 211/59.2 |
| 5,718,441 A * | 2/1998 | Kern | A47B 57/14 | 211/187 |
| 5,735,661 A * | 4/1998 | De Frondeville | B65G 1/08 | 193/36 |
| 5,743,412 A * | 4/1998 | Noble | A47F 1/121 | 211/182 |
| 5,816,419 A * | 10/1998 | Lamson | A47B 57/045 | 211/150 |
| 5,884,567 A * | 3/1999 | Bartz, Jr. | A47B 57/04 | 108/106 |
| 6,158,600 A * | 12/2000 | Ferrucci | A47B 55/02 | 108/147.11 |
| 6,230,906 B1 * | 5/2001 | Padiak | A47F 7/28 | 211/194 |
| 6,347,710 B1 * | 2/2002 | Ryan, Jr. | B07C 1/025 | 209/706 |
| 6,405,880 B1 * | 6/2002 | Webb | A47F 1/12 | 108/107 |
| 6,502,408 B1 * | 1/2003 | Corcoran | F25D 25/00 | 193/35 R |
| RE38,517 E * | 5/2004 | Pfeiffer | B65G 1/023 | 193/35 R |
| 6,948,900 B1 * | 9/2005 | Neuman | B62B 3/002 | 193/35 R |
| 7,210,587 B1 * | 5/2007 | Singer | A47F 7/145 | 211/55 |
| 7,815,060 B2 * | 10/2010 | Iellimo | B65G 1/023 | 108/61 |
| 7,963,060 B2 * | 6/2011 | Arndt | G09F 3/204 | 211/59.1 |
| 8,083,077 B2 * | 12/2011 | Wade | A47F 7/163 | 211/193 |
| 8,267,261 B2 * | 9/2012 | Vanderhoek | A01G 9/143 | 211/150 |
| 8,439,211 B2 * | 5/2013 | Emrani | A47B 49/00 | 211/162 |
| 8,944,260 B2 * | 2/2015 | Hawkins | A47F 5/0025 | 211/135 |
| 9,420,900 B1 * | 8/2016 | Simpson | B65G 1/08 | |
| 2004/0178156 A1 * | 9/2004 | Knorring, Jr. | A47F 1/12 | 211/59.2 |
| 2005/0115809 A1 * | 6/2005 | Lutz | B65G 13/12 | 198/860.1 |
| 2005/0173362 A1 * | 8/2005 | Squitieri | A47F 5/10 | 211/187 |
| 2008/0145197 A1 * | 6/2008 | Taylor | B65G 1/023 | 414/276 |
| 2010/0072092 A1 * | 3/2010 | Anscomb | B65D 85/68 | 206/319 |
| 2010/0242852 A1 * | 9/2010 | Conger | A01K 1/031 | 119/419 |
| 2011/0042334 A1 * | 2/2011 | Sucevich | A47F 5/0025 | 211/71.01 |
| 2011/0240576 A1 * | 10/2011 | Abbruzzese | A47F 10/02 | 211/85.3 |
| 2011/0309044 A1 * | 12/2011 | Morrow | A47F 5/005 | 211/59.2 |
| 2012/0325763 A1 * | 12/2012 | Loy | G09F 7/22 | 211/134 |
| 2016/0113421 A1 * | 4/2016 | Muzyka | A47B 57/08 | 211/85.26 |
| 2017/0243155 A1 * | 8/2017 | Reuter | A47F 5/108 | |
| 2018/0060802 A1 * | 3/2018 | Uygun | B25H 3/04 | |
| 2019/0016533 A1 * | 1/2019 | Post | B65G 1/137 | |

* cited by examiner

EFFICIENT SERVICE RACK SYSTEM

BACKGROUND

Typical vehicle maintenance visits at a vehicle service facility require a service technician to perform discrete and repeatable maintenance tasks on a vehicle, or set of vehicles. For example, typical vehicle maintenance may require a service technician to perform an oil change, check fluid levels, inspect or replace filters, inspect and repair tires, etc. In some instances, the performance of such maintenance tasks may be subject to inefficiencies that cause service time delays. Because the maintenance tasks are performed frequently and potentially on multiple vehicles, the service time delays can cause significant throughput delays within a service facility.

BRIEF SUMMARY OF THE INVENTION

The present disclosure presents new and innovative systems for ensuring service carts are stocked. In one aspect, a service rack system is provided including a service rack and one or more totes. Each of the one or more totes have a full indicator and a refill indicator. The service rack includes a front side, a back side, a right side, and a left side. The front side is directly opposite the back side. The service rack also includes a panel on each of the right and left sides, at least one supply rack angled towards the front side, and at least one return rack angled towards the back side. The at least one supply rack is constructed to support one or more columns of totes such that each column includes at least two totes. Each column of totes has a full state and a refill state. The full state includes at least two totes positioned such that the full indicator of one tote faces the front side. The refill state includes a tote positioned such that its refill indicator is directly adjacent to the front side.

In a second aspect according to any of the previous aspects, the full indicator is a first color and the refill indicator is a second color different than the first color.

In a third aspect according to the second aspect, the panel is a third color different than the first color and the second color.

In a fourth aspect according to any of the previous aspects, the full state includes two totes and the totes are positioned such that the full indicator of a first tote faces the front side and the full indicator of a second tote faces the back side.

In a fifth aspect according to any of the previous aspects, the refill state of a column of totes includes one tote remaining in the column of totes.

In a sixth aspect according to any of the previous aspects, the at least one return rack is constructed to support one or more columns of totes.

In a seventh aspect according to any of the previous aspects, the at least one supply rack and the at least on return rack include one or more adjustable rollers.

In an eighth aspect according to any of the previous aspects, the at least one supply rack or the at least one return rack include dividers separating each of the one or more columns.

In a ninth aspect according to any of the previous aspects, the at least one supply rack is angled to cause totes located on the at least one supply rack to move towards the front side and the at least one return rack is angled to cause totes located on the at least one return rack to move towards the back side.

In a tenth aspect, a service rack system is provided including a service rack and one or more totes. The service rack includes a front side, a back side, a right side, and a left side. The front side is directly opposite the back side. The service rack also includes at least one supply rack angled towards the front side that includes one or more adjustable rollers, and at least one return rack angled towards the back side that includes one or more adjustable rollers. The one or more totes each include at least a full indicator and a refill indicator. The one or more totes are positioned on the at least one supply rack in one or more columns that each include at least two totes. The totes in each column are positioned in one of a full state and a refill state. The full state includes at least two totes positioned such that the full indicator of one tote faces the front side. The refill state includes one tote positioned such that its refill indicator is directly adjacent to the front side.

In an eleventh aspect according to the tenth aspect, the service rack includes a panel on each of the right side and the left side of the service rack.

In a twelfth aspect according to any of the tenth to eleventh aspects, the full indicator is a first color and the refill indicator is a second color different than the first color.

In a thirteenth aspect according to any of the tenth to twelfth aspects, the full state includes two totes, and the totes are positioned such that the full indicator of a first tote faces the front side and the full indicator of a second tote faces the back side.

In a fourteenth aspect according to any of the tenth to thirteenth aspects, the refill state of a column of totes includes one tote remaining in the column of totes.

In a fifteenth aspect according to any of the tenth to fourteenth aspects, the at least one supply rack or the at least one return rack includes dividers separating each of the one or more columns.

In a sixteenth aspect according to any of the tenth to fifteenth aspects, the at least one supply rack is angled to cause totes located on the at least one supply rack to move towards the front side and the at least one return rack is angled to cause totes located on the at least one return rack to move towards the back side.

In a seventeenth aspect, a method is provided which includes receiving vehicle fleet data specifying the types of vehicles operating in a vehicle fleet. The method also includes determining, based on the vehicle fleet data, a distribution of vehicle models in the vehicle fleet, and identifying, based on the distribution of vehicle models, vehicle models that are most common in the vehicle fleet. The method also includes identifying service items compatible with the vehicle models that are most common in the vehicle fleet, and identifying, from among the service items compatible with the vehicle models that are most common in the vehicle fleet, service items for storage on a service rack.

In an eighteenth aspect according to the seventeenth aspect, the service items for storage on the service rack are also selected to correspond to maintenance tasks that are most frequently performed on vehicles in the vehicle fleet.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION

Figure 1:
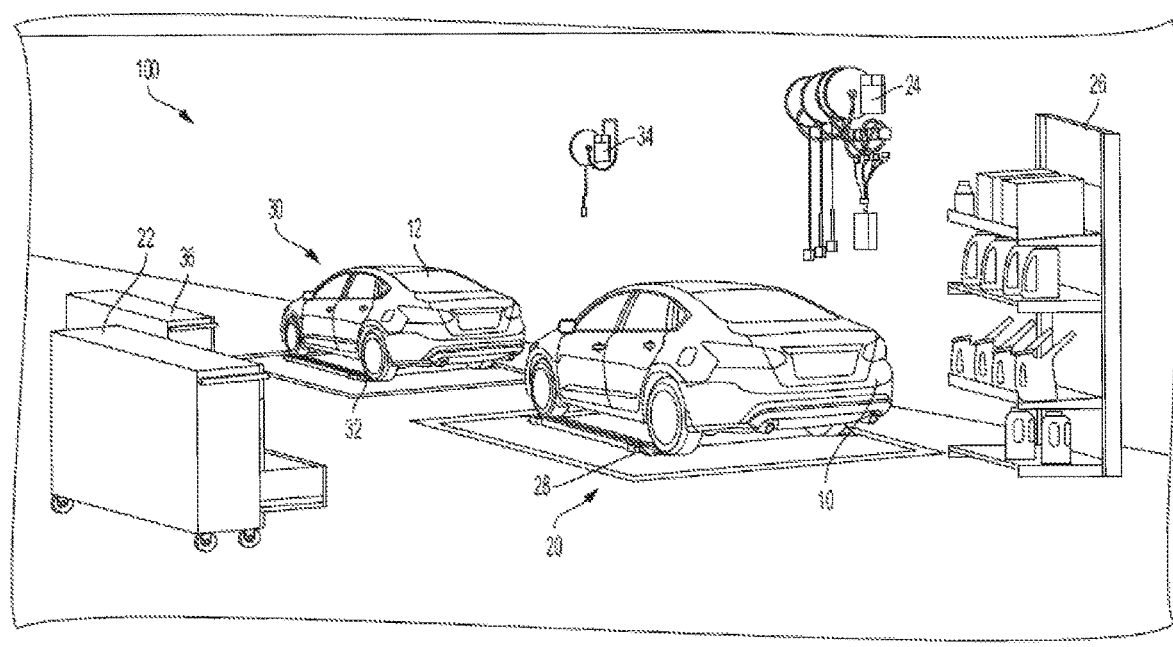
FIG. 1 illustrates a service facility according to an example of the present disclosure.

Service facility efficiency may be essential to keep pace with changes in vehicle technology. For example, as vehicle technology advances and becomes more sophisticated, transportation providers may be unaware of how their vehicles actually function and, as a result, transportation providers may be unable to provide specific information to a service technician with respect to any particular problems their vehicle is currently experiencing. Thus, service technicians may perform multiple maintenance tasks on a vehicle in an attempt to rule out certain causes of the problems and/or to detect problems that the transportation provider may not have identified or otherwise noticed. Performing multiple maintenance tasks on a vehicle in an attempt to resolve current maintenance problems and prevent potential maintenance problems is a strategy often used by organizations that rely on fleets of cars for operation. For example, transportation network companies (TNCs) rely on fleets of cars that are used to service transportation requests (e.g., rideshare requests). A vehicle associated with the TNC may be brought in for servicing without any preliminary technical understanding of the maintenance issues the vehicle may be experiencing. Thus, a TNC may systematically perform multiple maintenance tasks on the vehicle in an attempt to identify maintenance issues. While the vehicle is being serviced by the TNC, the vehicle is not available to service transportation requests in the transportation network.

Accordingly, any reduction in time spent servicing TNC vehicles may result in additional fleet capacity for the TNC (i.e., the vehicle can spend more time on the road servicing transportation requests). Furthermore, reductions in service times at a service facility may increase the frequency with which vehicle operators (e.g., transportation providers) bring a vehicle to a service facility for servicing (e.g., a driver may be incentivized to service the vehicle because it will not take an extreme amount of time to do so), allowing for continuous maintenance to be performed on the vehicle. Performing continuous and rapid maintenance tasks on the vehicle may increase long-term vehicle reliability of the vehicle because future vehicle problems may be avoided.

Maintenance efficiency problems may be even more evident for fleets of autonomous vehicles (AVs). For example, as more rideshare requests are serviced by AVs, TNCs may cultivate AV fleets. Because AVs do not have transportation providers, there is no individual who can provide feedback on the current operation of the vehicle outside of the information available from vehicle's pre-installed sensors. Therefore, when servicing AVs, maintenance personnel may have to perform an even more rigorous set of maintenance tasks w to identify problems and to determine the causes of identified problems.

For example, in a typical vehicle service scenario, service personnel may discuss problems associated with the vehicle being serviced to identify any known problems that the service personnel should address, in addition to performing standard maintenance servicing. For example, a driver may request oil change but may explain to a service technician that one of the tire assemblies vibrates at high speeds. In response, service personnel may inspect the tire assembly in addition to servicing the vehicle (e.g., performing the oil change). If a problem is identified, the service personnel may formulate a repair to resolve the issue, which may require waiting for replacement parts for the tire assembly. Once the tire assembly is repaired, the service technician may test drive the vehicle to verify the repair and, upon completion of the servicing, the driver may pick up their vehicle.

For AVs, since there is no driver to identify additional issues with the vehicle, the service personnel may have to perform additional maintenance tasks on a regular basis to identify potential maintenance problems. For example, rather than relying on a driver to identify that a tire assembly is vibrating at high speeds before inspecting a tire assembly, AV service personnel may routinely perform the tire assembly inspection. In the context of TNC fleets of AVs, AV service personnel may inspect the vehicle's tire assemblies during regular maintenance visits, in addition to performing other maintenance tasks.

Vehicle fleet operators such as TNCs may also incorporate additional maintenance tasks for preventative purposes, even for vehicles that are not autonomous. For example, if the tire assemblies are inspected at each maintenance visit, potential problems with the tire assemblies may be detected and repaired before the tire assembly becomes a more serious maintenance issue. Such preventative maintenance may increase vehicle uptime for the TNCs and may allow transportation providers to continue operating their vehicles more often and/or for longer periods of time. Furthermore, as the size of vehicle fleets grows, there may be greater pressure on service facilities to process a greater number of vehicles in the same amount of time, which increases the need to perform maintenance tasks (e.g., preventative and/or standard maintenance tasks) in a time-efficient manner. Accordingly, there exists a need to expedite the performance of maintenance tasks on vehicles that are serviced within a service facility.

Another factor contributing to inefficiencies with regard to maintenance tasks is ensuring service technicians have the necessary service items (e.g., tools, parts, consumables, equipment, etc.) for completing any given maintenance task, so that the service technicians do not have to spend significant amounts of time locating the necessary service items.

As used throughout this disclosure, service items may refer to any tool, part, consumable, equipment, etc. that a service technician may need to perform a maintenance task on a vehicle. Such tools may be wrenches, sockets, tire irons, and other tooling used for vehicle maintenance. Such parts may be drain plugs, lug nuts, hex bolts, oil caps, O-rings, air filters, oil filters, fuel filters, and other vehicular parts. Consumables may be automobile oil, transmission fluid, battery cleaner, brake cleaner, and other chemicals, fluids, etc., used for and/or during the performance of maintenance tasks. Equipment may be gloves, ear plugs, face masks, and/or other personal safety items a service technician may need to complete a service task.

For instance, when a vehicle arrives for at a service facility for maintenance, a service technician either already knows the maintenance task that is required (e.g., from a repair order) or must perform a diagnostic to identify a needed maintenance task. Once the maintenance task is determined, the service technician must obtain the necessary service items for the task that are compatible with the specific vehicle (e.g., model or type) being serviced. For example, the service technician may need to change the transmission fluid in the vehicle and thus must obtain transmission fluid, or the service technician may need to obtain a wrench and bolt to replace a bolt on a wheel. If the necessary service items are not nearby, the service technician may have to walk across a service facility to obtain the service items from another location, such as a parts storage location or room, which ultimately lengthens the time required to perform and complete the maintenance task. In some instances, the service technician may not know where to find a particular service item, thus further increasing the time required to perform the maintenance task. Because most, if not all, maintenance tasks require at least one service item, any decrease in the amount of time required for a service technician to obtain the necessary service items may drastically improve a service facility's ability to service more vehicles and thereby improve the overall performance of the service facility.

One solution to the problem described above is to establish a service facility that effectively divides maintenance tasks into subgroups that can be performed at different stations located within the service facility. For example, FIG. 1 depicts a service facility 100 including service stations 20, 30 servicing separate vehicles 10, 12. Each service station 20, 30 may correspond to the performance of different maintenance tasks. For example, service station 20 may correspond to performing maintenance tasks related to fluids (e.g., changing the oil, checking transmission fluid). Service station 30 may correspond to performing inspections and repairs of tire assemblies. As servicing is complete at one station 20, 30, the vehicles 10, 12 may move to the next station. For example, after vehicle 10 has its oil changed at station 20, the vehicle 10 may proceed to service station 30 for tire assembly inspection.

Each service station 20, 30 may require separate service items for performing the maintenance tasks corresponding to the respective station. For example, the service station 20 includes a rack 26 storing fluids which may be replaced during maintenance, along with fluid lines 24, which may route to larger tanks of fluids (e.g., different types of oil) that are commonly replaced during maintenance of a vehicle. Similarly, service station 30 includes a compressed air line 34, which may be used to refill tires (e.g., to a desired tire pressure). Both service stations 20, 30 also include a tool cart 22, 36 respectively. These tool carts 22, 36 may contain certain service items necessary for performing the maintenance tasks at service station 20, 30. For example, the tool cart 22 may include tools such as wrenches or sockets in common sizes necessary to loosen drain plugs on oil pans, and may also include replacement drain plugs for a variety of vehicles. As another example, the tool cart 36 may include filters (e.g., fuel filters or oil filters) for replacing old filters on vehicles. Each service station 20, 30 also includes a lift 28, 32 for use in performing maintenance tasks on vehicles, although other service stations that are not depicted may not include a lift in certain instances.

Even though efficiency may increase by separating the maintenance tasks into different service stations 20, 30, the performance of certain maintenance tasks may still be improved. For example, in some instances, a tool cart 22, 36 may run out of a certain service item, causing the service technician t to spend time retrieving the service item that could have otherwise been spent performing maintenance tasks. Thus, the time that it takes to obtain the necessary service item increases the amount of time it takes to complete the maintenance task, and accordingly limits efficiency. One solution to this problem is for service technicians to notify a service facility worker when a particular service item in the tool cart 22, 36 is low so that the service facility worker can restock the particular service item prior to it running out. However, a service technician may easily forget to notify a service facility worker, and they may easily forget to restock the service item. Additionally, notifying the service facility worker to restock service items consumes time that a service technician could instead spend performing maintenance tasks.

Another solution is for the service facility worker to periodically check the levels of all the service items in the tool carts 22, 36 and restock the service items that are low. However, different service items are used at different rates, sometimes unpredictably, and thus service items may run out between instances in which the service facility worker checks the service item levels. Additionally, the service facility worker may check the tool carts 22, 36 and see that none of the service items are running low, causing the service facility technician to waste time. Furthermore, such a process is inefficient because the tool carts 22, 36 are only accessible from a single side, and each drawer must be inspected individually. Such configurations require the service facility technician to intervene in the performance of maintenance tasks by the service technician, further reducing the efficiency of performed maintenance tasks.

To solve these technical problems, among others, the present disclosure provides a service rack system that can be utilized to efficiently ensure that service technicians have the necessary service items at their disposal to perform maintenance tasks in a time-efficient manner. The service rack system may include a service rack with multiple racks and multiple totes positioned on the multiple racks. The multiple totes may contain various service items. Some of the multiple racks may be angled towards the front side of the service rack and some of the racks may be angled towards the back side of the service rack. Each of the totes may include two indicators, the first indicator indicating that the supply of the respective service items is full, or sufficiently full, and the second indicator indicating that a refill is needed for the respective service item. Accordingly, the totes may be positioned on the racks angled to the front side such that when the racks are full and a service technician views a service rack from its front side, the service technician sees only the first indicator of each tote at the service rack's front side.

When a tote is empty, a service technician may remove it from its rack, which causes a full tote behind the empty tote to move into the empty tote's place due to the rack's angle toward the front side of the service rack. In some examples, the full tote may be positioned on the rack such that the service technician sees its second indicator at the rack's front side, thus indicating to the service technician that the service items corresponding to or otherwise associated with the tote need a refill. The service technician may place the empty tote on a rack angled to the back side with the tote's second indicator facing the back side. Thus, when a service facility worker views the service rack from its back side, the worker knows one or more service items need refilling in the event the worker can see the second indicator of any totes. Accordingly, the technician may refill the empty totes and place them back on a rack angled to the front side before the service technician runs out of any service item.

Figure 2A:
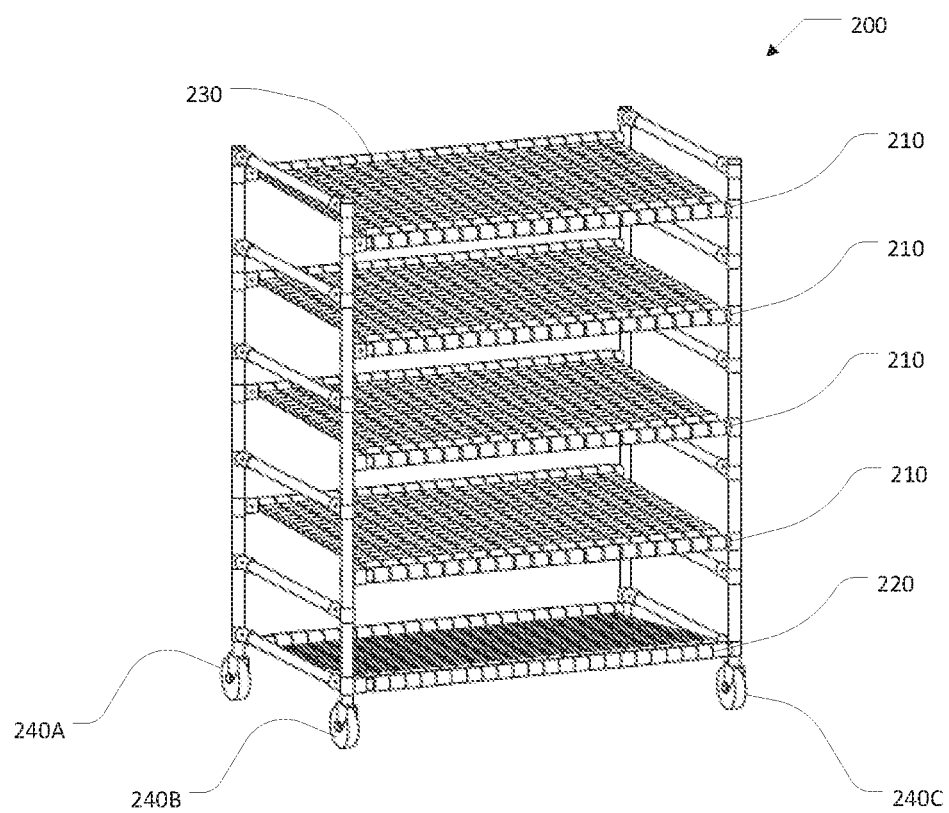
FIGS. 2A and 2B illustrate a perspective and front view, respectively, of an empty service rack according to an example of the present disclosure.
Figure 2B:
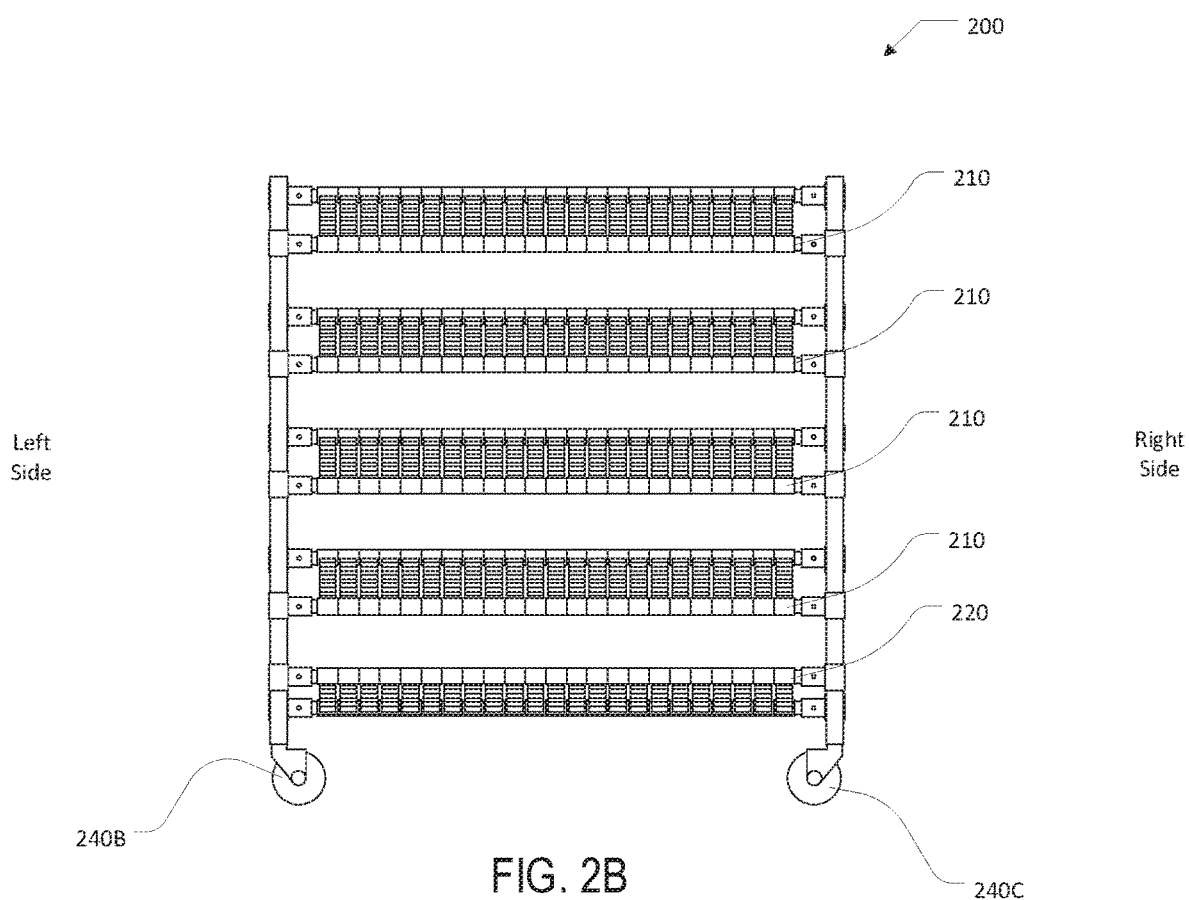

FIGS. 2A and 2B illustrate a service rack 200 according to an example of the present disclosure. The service rack 200 may include at least one supply rack 210 and at least one return rack 220. For instance, the service rack 200 is shown as having four supply racks 210 and one return rack 220. In other instances, however, the service rack 200 may include more or less supply racks 210 and/or more return racks 220. In some examples, the service rack 200 is configured top of the service rack 200 is located at a height from the ground that does not interfere with the vision across the service facility for a majority of people (e.g., the service rack 200 does not block a line of sight). For instance, the service rack 200 may be no more than four and a half feet tall in some examples given that a majority of people may see over such a service rack 200. In such implementations, the service rack 200 may allow those working in the service facility to visually survey the service facility (e.g., see a tote's second indicator on a service rack from across the facility) and thus enhance efficiency.

As depicted in FIGS. 2A and 2B, each of the supply racks 210 is angled towards the front side of the service rack 200 and the return rack 220 is angled in the opposite direction towards the back side of the service rack 200 (will be additionally depicted and explained in further figures). In some examples, each of the supply racks 210 and return racks 220 include multiple rollers 230, which will be described in more detail below. In some examples, the service rack 200 may also include wheels 240A-D (wheel 240D not depicted). The wheels 240A-D may enable easier movement of the service rack 200. For example, the service rack 200 may be moved from service station 20 to service station 30, for example if/when the service item requirements of the stations change.

Figure 3A:
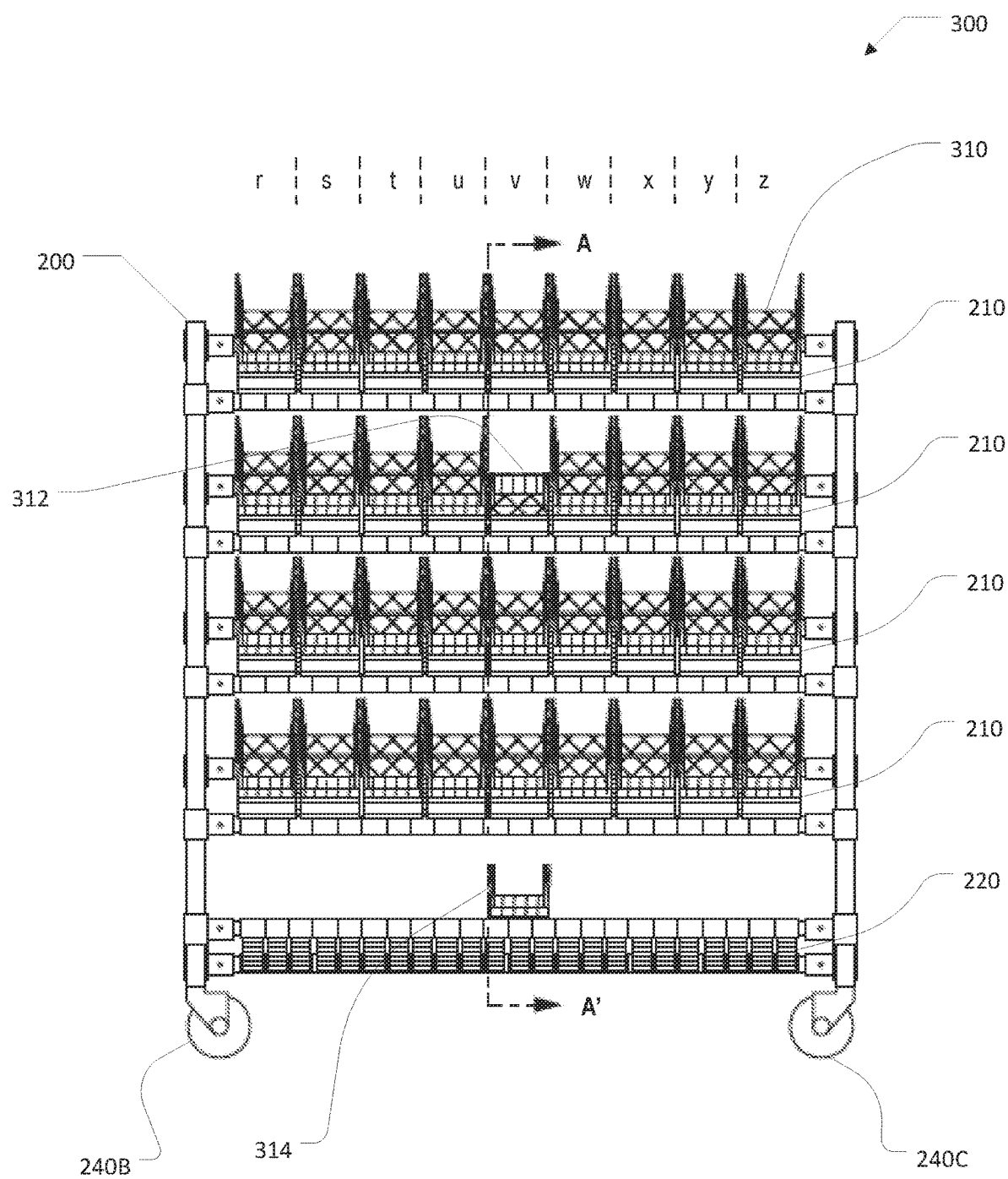
FIGS. 3A and 3B illustrate a front view of a service rack with totes and a side view along plane A-A', respectively, according to an example of the present disclosure.
Figure 3B:
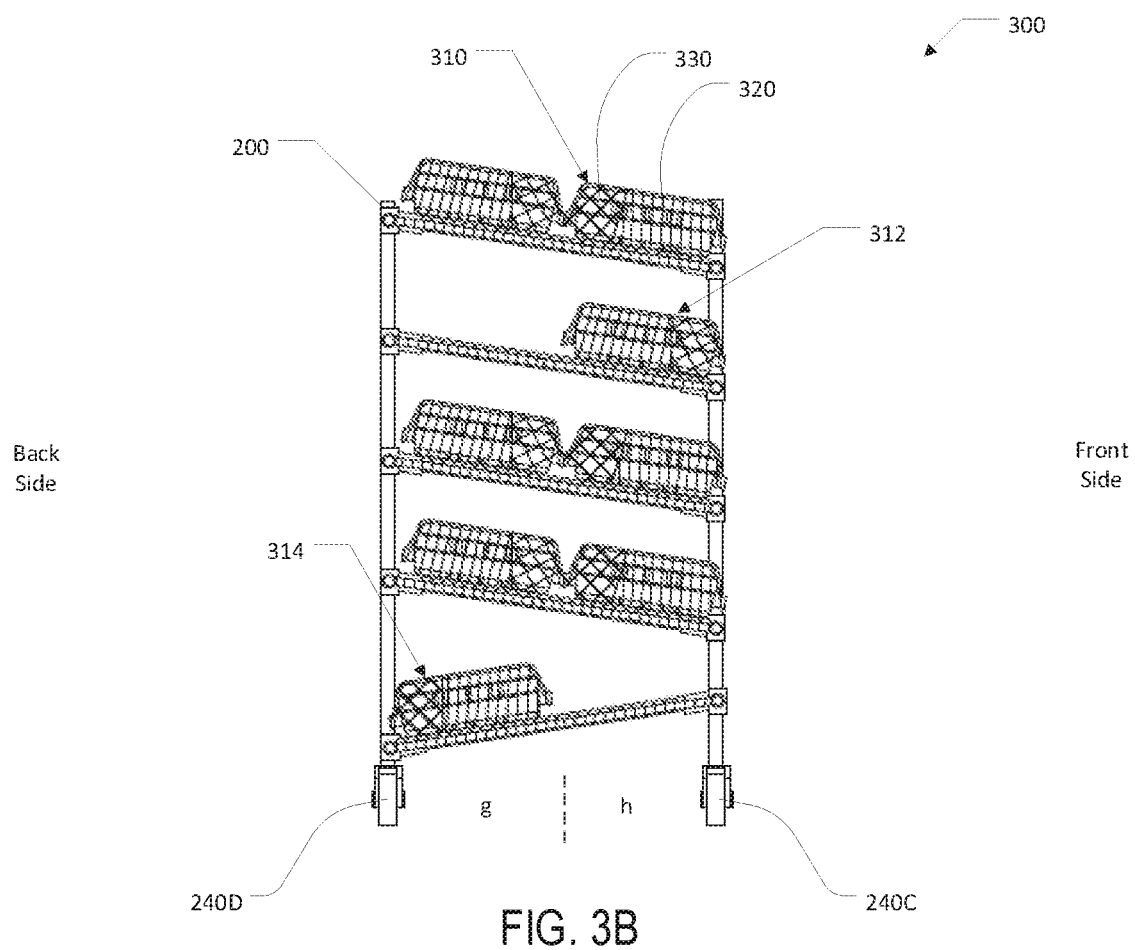

FIGS. 3A and 3B illustrate a service rack system 300 that includes a service rack 200 and multiple totes 310, according to an example of the present disclosure. In particular, FIG. 3B illustrates a side view of the service rack system 300 at the plane A-A' designated in FIG. 3A. Each of the totes 310 is constructed to hold one or more of various service items. For clarity, only a single tote 310 is labeled, but references to totes 310 should be understood to refer to any such depicted tote. The totes 310 are positioned on the supply racks 210 in multiple columns and at least two rows. For instance, the totes 310 are positioned in columns r-z and rows g, h in the example service rack system 300. Accordingly, FIG. 3B depicts a side view of column v of the service rack system 300 along plane A-A'. In some examples, each column r-z is dedicated to a particular service item, and thus each tote 310 in a specific column (e.g., two totes 310 if there are two rows) holds one or more of the particular service item. In some examples, each tote 310 may be labeled with the name of the particular service item the tote is supposed to hold. A column of totes 310 may either be in a full state or a refill state, which will be described in more detail below.

In various examples of the present disclosure, each of the totes 310 includes a full indicator 320 (e.g., first indicator) and a refill indicator 330 (e.g., second indicator). The full indicator 320 may indicate that there is a sufficient amount of the particular service item associated with a column of totes 310 on the supply rack 210. The refill indicator 330 may indicate that there is not a sufficient amount, and further, that the particular service item associated with the column of totes 310 needs to be refilled. In some examples, the full indicator 320 may be a first color (e.g., blue) such that a portion of a tote 310 is the first color, and the refill indicator 330 may be a second, different color (e.g., orange) such that the remaining portion of the tote 310 is the second color. In some examples, the two colors are distinctly different such that they may be quickly differentiated (e.g., orange and blue, red and green). The two different colors are depicted in the accompanying figures by two different shading patterns on the totes 310. In other examples, color associated with the full indicator 320 and the color associated with the refill indicator 330 color may collectively cover a portion of the tote 310 less than the entirety of the tote 310 (e.g., only the front and back, respectively). In other examples, the full and refill indicators 320, 330 may be distinctive visual indications other than colors, for instance, text, lights, images, tote design, visual patterns, etc.

In at least one example of the present disclosure, the service rack system 300 may additionally include optical sensors on the service rack 200. The optical sensors may be configured to detect the color of a surface. In the at least one example, the optical sensors may be positioned on the service rack 200 such that they sense the surface color of the portion of each of the totes 310 that is adjacent to the front side of a supply rack 210 and/or adjacent to the back side of a return rack 220. Accordingly, when the optical sensors detect that the color of the refill indicator 330 is present, the optical sensors may cause an action to be triggered. For instance, the optical sensors may light up, may cause the service rack 200 to light up, or may cause an empty tote 310 to light up when detecting the refill indicator 330 color. In other instances, as will be described in more detail below, the optical sensors may send a signal to an automated robot when detecting the refill indicator 330 color, thus causing the automated robot to activate and refill an empty tote 310.

In at least one example of the present disclosure, the service rack system 300 may additionally include radio frequency identification ("RFID") sensors, such as a virtual wall, and the service items in the totes 310 may include RFID tags. Accordingly, the RFID sensors (e.g., virtual wall) may detect service items being used and may cause additional service items to be ordered when the remaining service items reach a certain threshold. In some instances, the virtual wall may span the entire front side of the service rack 200, the entire rear side of the service rack 200, and/or may span across each side of the service rack 200.

In various aspects, the totes 310 may be positioned on the supply racks 210 and return racks 220 based on their indicators 320, 330. As will be further described below, the tote 310 positioning provides visual indications to those working in a service facility as to the state of the supply of various service items on the service rack 200. A service rack 200 may be considered full when there is a tote 310 in every column and every row on each of the supply racks 210, or when there is a tote in every column and every row of the supply racks in which a part is intended to be stored. In some examples, when a service rack 200 is full, there are no totes 310 on any return rack 230 of the full service rack 200. The totes 310 on a full service rack 200 may be positioned such that each of the totes 310 adjacent to the front side of the service rack 200 (e.g., row h in FIG. 3B) has its full indicator 320 facing towards the front side of the service rack 200 (e.g., the front side of the supply rack 210 the tote 310 is on). Accordingly, when a service technician or other person views a full service rack 200 from the front, they will primarily see only the full indicator 320 of each tote 310, and will primarily not see the refill indicator 330 of any tote 310. In addition, the totes 310 on a full service rack 200 may be positioned such that each of the totes 310 closest to the back side of the service rack 200 (e.g., row g in FIG. 3B) has its full indicator 320 facing towards the back side of the service rack 200. Accordingly, when a service facility worker or other person views a full service rack 200 from the back, they will primarily see only the full indicator 320 of each tote 310, and will primarily not see the refill indicator 330 of any tote 310. Therefore, a column of totes 310 on a respective supply rack 210 is in a full state when there are at least two totes 310 in the column, the tote 310 adjacent to the front side of the service rack 200 has its full indicator 320 facing towards the front side, and the tote 310 closest to the back side of the service rack 200 has its full indicator 320 facing towards the back side.

In some examples of the present disclosure, such as the illustrated examples, the service rack 200 is constructed such that its respective supply racks 210 fit two rows of totes 310. The respective return racks 220 may also fit two rows or may fit other numbers of rows (e.g., 1 or 3). In such examples, in accordance with the description in the preceding paragraph, the two totes 310 in the same column on the same supply rack 210 of a full service rack 200 are positioned such that their respective refill indicators 330 face one another. Thus, when the front side tote 310 is removed from the supply rack 210, the back side tote 310 moves forward to take its place and the back side tote 310 then accordingly has its refill indicator 330 facing towards the front side of the supply rack 210 (e.g., the front side of the service rack 200). Such a column of totes 310 is therefore in a refill state because a tote 310 in the column has its refill indicator 330 adjacent to the front side of the supply rack 210. When the front side tote 310 is removed, due its initial orientation on the supply rack 210, the front side tote 310 may be placed on the return rack 220 with its refill indicator 330 facing towards the back side of the return rack 220 (e.g., the back side of the service rack 200). For instance, the tote 314 is illustrated in FIGS. 3A and 3B as having been removed from column v on the second supply rack 210 from the top and subsequently placed on the return rack 220 with its refill indicator 330 adjacent to the back side of the return rack 220. Accordingly, the tote 312 is illustrated as having moved forward to take the place of the tote 314, and the tote 312 has its refill indicator 330 adjacent to the front side of the supply rack 210.

Therefore, in this way, when the example service rack system 300 is viewed from the front as illustrated, the refill indicator 330 of the tote 312 is visible, thus indicating that the service items associated with the totes 312, 314 are low on the service rack 200. In addition, the refill indicator 330 of the tote 314 is visible when the example service rack system 300 is viewed from the back. Therefore, no matter if the service rack system 300 is viewed from the front or the back, those working in the service facility may be able to see the refill indicator 330 and can accordingly restock the service items of the respective tote 310 before the service rack system 300 runs out of that service item.

Figure 4A:
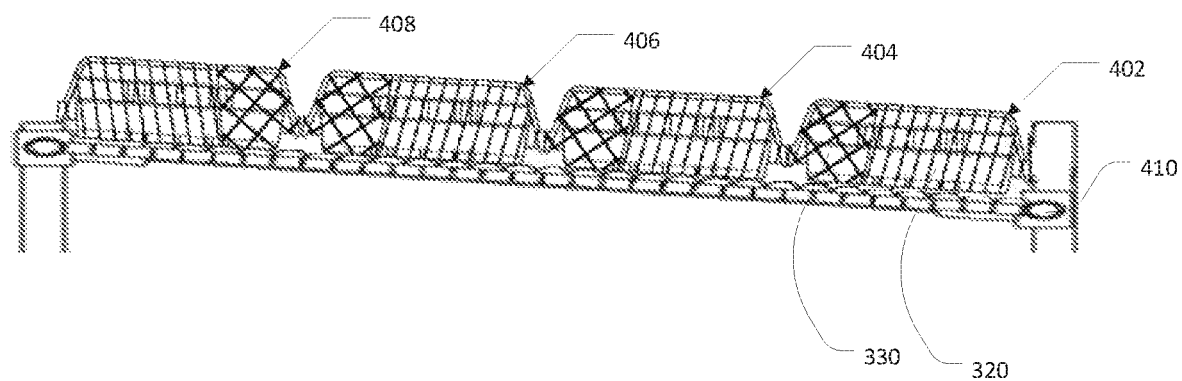
FIGS. 4A and 4B illustrate individual supply racks constructed to fit more than two totes, according to an example of the present disclosure.

In other aspects of the present disclosure, the service rack 200 is constructed such that its respective supply racks 210 fit more than two rows of totes 310. In such examples, the one or more return racks 220 may fit the same number of rows as the corresponding supply racks 210 or may fit a different number of rows. In some examples in which the supply racks 210 fit more than two rows, the totes 310 in the middle of the front side tote 310 and the back side tote 310 may be positioned in the same manner as the front side tote 310. For instance, as illustrated in FIG. 4A on the example supply rack 410, the totes 404 and 406 are in the middle of the front side tote 402 and the back side tote 408, and are positioned with their respective full indicators 320 and refill indicators 330 in the same manner as the front side tote 402. For clarity, the full and refill indicators 320 and 330 are only labeled on the tote 402; however, they are consistent with the shading patterns among the totes 404-408 indicating that the totes 404-408 include similar indicators. Accordingly, when the tote 402 is removed from the supply rack 410 and the tote 404 moves forward to replace it, the tote 404 has its full indicator 320 adjacent to the front side of the supply rack 410. Similarly, when the tote 404 is removed and the tote 406 moves to replace it, the tote 406 has its full indicator 320 adjacent to the front side of the supply rack 410. However, when the tote 406 is removed and the back side tote 408 reaches the front side of the supply rack 210, the tote 408 has its refill indicator 330 adjacent to the front side indicating to those in the service facility that the service items in the respective column need to be refilled. The removed totes 402-406 may be placed on the return rack 220 consistent with the preceding description to indicate to those viewing the service rack system 300 from behind, of which the example supply rack 410 is a part, that the service items need to be refilled.

Figure 4B:
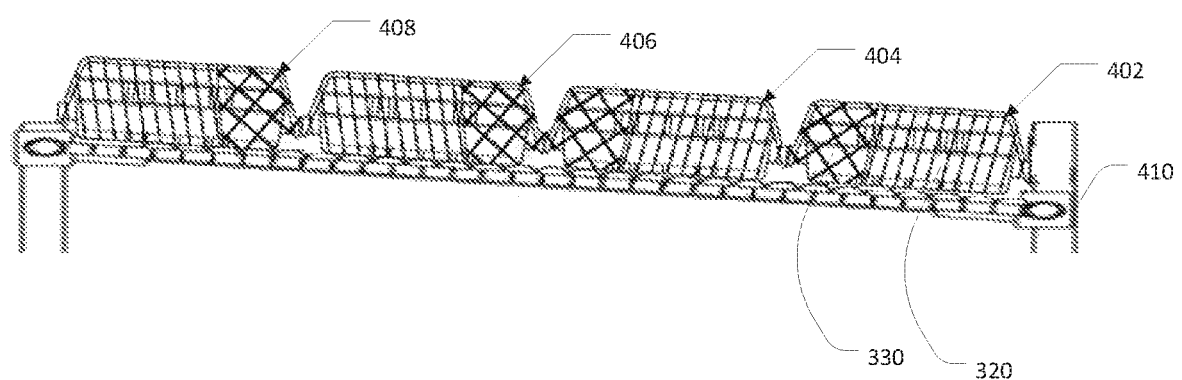

In other examples in which the supply racks 210 fit more than two rows, it may be desired to indicate to those in the service facility that a particular service item needs to be refilled prior to the back side tote 310 reaching the front side of the supply rack 210. In such instances, one or more of the middle totes 310 may be positioned in the same manner as the back side tote 310. For instance, as illustrated in FIG. 4B on the example supply rack 410, the tote 406 is positioned with its full indicator 320 and refill indicator 330 in the same manner as the back side tote 408. Accordingly, when the tote 402 is removed from the supply rack 410 and the tote 404 moves to replace it, the tote 404 has its full indicator 320 adjacent to the front side of the supply rack 410. However, in contrast to the example illustrated in FIG. 4A, when the tote 404 is removed and the tote 406 moves to replace it, the tote 406 has its refill indicator 330 adjacent to the front side of the supply rack 410. Therefore, it is indicated to those in the service facility that the service items in the respective column need to be refilled when there are still the two totes 406 and 408 on the supply rack 410. Again, the removed totes 402, 404 may be placed on the return rack 220 to indicate to those viewing the service rack system 300 from behind (of which the example supply rack 410 is a part) that the respective service items need to be refilled. Accordingly, the indication being made with two full totes 406, 408 remaining on the supply rack 410 may provide additional time for those in the service facility to refill the respective service items prior to the service rack system 300 running out of the respective service item, as compared to the example described in FIG. 4A. Thus, efficiency and/or supply level resiliency may be increased in such configurations.

As described above in connection with multiple examples, a tote 310 may move on its respective supply rack 210 or return rack 220. For instance, a tote 310 may move when a tote 310 in front of it is removed, or when the tote 310 is placed on the supply rack 210 or the return rack 220 without a tote 310 in front of it. The totes 310 may move due to the angle of the supply racks 210 and return racks 220 that cause the totes 310 to have a tendency to move towards the lowest part of its respective supply rack 210 or return rack 220 due to gravitational forces. For example, the totes 310 on supply racks 210 have a tendency to move towards the front side of the service rack 300 and the totes 310 on return racks 220 have a tendency to move towards the back side of the service rack 300. In some examples of the present disclosure, the surface of each of the supply racks 210 and return racks 220 may help facilitate the totes 310 moving. For instance, the surface of each may have a low coefficient of friction (e.g., a slick surface) such that the totes 310 may slide along the surface due to only gravitational forces. In other examples, each of the supply racks 210 and return racks 220 may have multiple rollers 230 that rotate as the totes 310 move over them in accordance with gravitational forces. The rollers 230 may reduce sliding forces on the bottom of the totes 310 even further, and thus may prolong the life of the totes 310 before needing to be replaced.

Figure 5A:
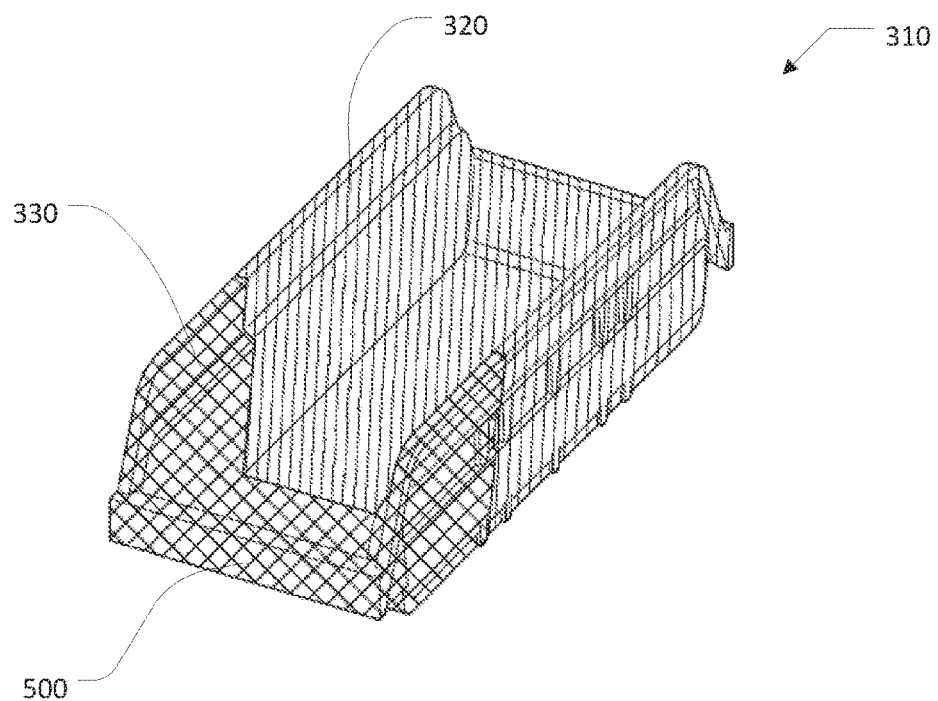
FIGS. 5A and 5B illustrate a perspective view and side view, respectively, of an empty tote according to an example of the present disclosure.
Figure 5B:
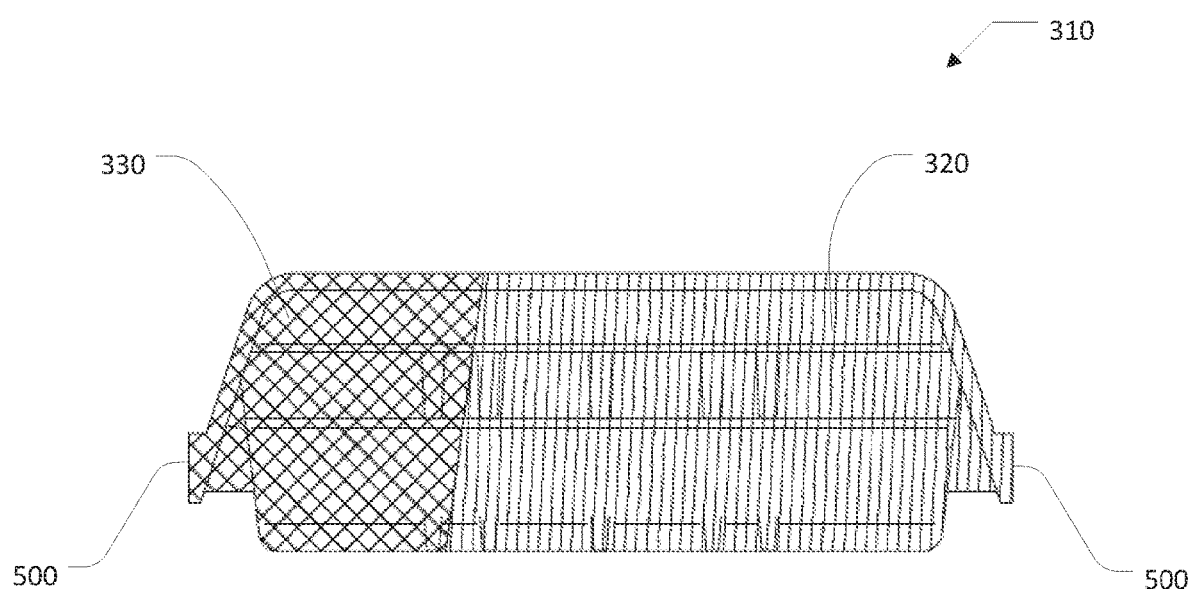

FIGS. 5A and 5B illustrate perspective and side views of a tote 310, according to an example of the present disclosure. As described above, the tote 310 includes a full indicator 320 and a refill indicator 330, which each may be a color over a portion of the tote 310. In various examples, each tote 310 may also include a label at location 500, the label designating which service items are in the respective tote 310. In other examples, each tote 310 may include a label at a different location. The label may be text, an image, a color, or another designation for specifying the service items stored or intended for storage in the tote. Each tote 310 is constructed to hold one or more service items, and thus may have any suitable design that enables the tote 310 to both hold one or more service items, and be positioned on the supply racks 210 and return racks 220 as described above. Accordingly, the illustrated design of the tote 310 is merely one example. In some examples of the present disclosure, there may be totes 310 of different sizes and designs utilized on the same service rack 200.

Figure 6A:
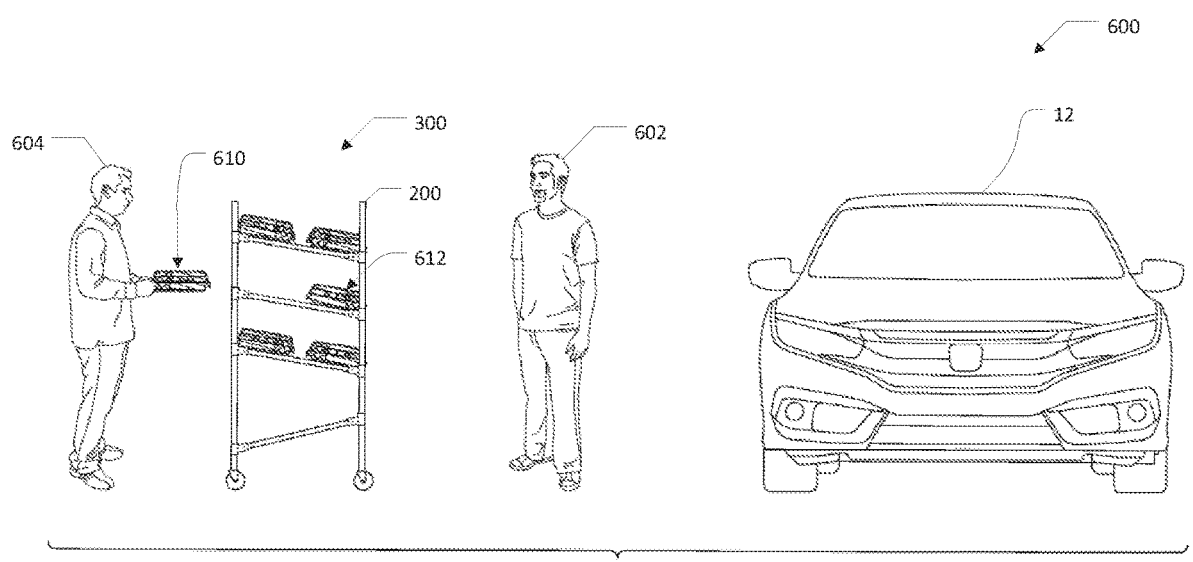
FIGS. 6A and 6B illustrate two aspects of a service station according to an example of the present disclosure.

FIG. 6A depicts one example of a service station 600 in which a service technician 602 is performing a maintenance task on a vehicle 12 and a service facility worker 604 is placing a refilled tote 610 on a service rack system 300. The service technician 602 is at the front side of the service rack system 300 and the service facility worker 604 is at the back side of the service rack system 300. For instance, the service technician 602 may have previously used all of the service items in the tote 610 and placed an empty tote 610 on the return rack 220 with its refill indicator 330 facing the back side. The tote 612 therefore moved forward with its refill indicator 330 adjacent to the front side. The service facility worker 604 may have then seen the refill indicator 330 of either the tote 610 or the tote 612 and accordingly took the empty tote 610 to refill it. FIG. 6A illustrates the service facility worker 604 placing the refilled tote 610 back on the service rack 200 on its respective supply rack 210 at its respective column.

In some aspects of the present disclosure, the service facility worker 604 may place the refilled tote 610 on the supply rack 210 such that its full indicator 320 faces towards the front side of the supply rack 210. Accordingly, in such instances, when the tote 612 is removed and refilled, the tote 610 will move forward and its full indicator 320 will be adjacent to the front side. This aspect is illustrated in FIG. 6A. In other aspects of the present disclosure, the service facility worker 604 may place the refilled tote 610 on the supply rack 210 such that its refill indicator 230 faces towards the front side of the service cart 300 and also may position the tote 612 such that its full indicator 220 is adjacent to the front side of the service cart 300. Accordingly, in this way, the service facility worker 604, after refilling the tote 610, positions the totes 610 and 612 to reflect that their respective column is in a full state.

Figure 6B:
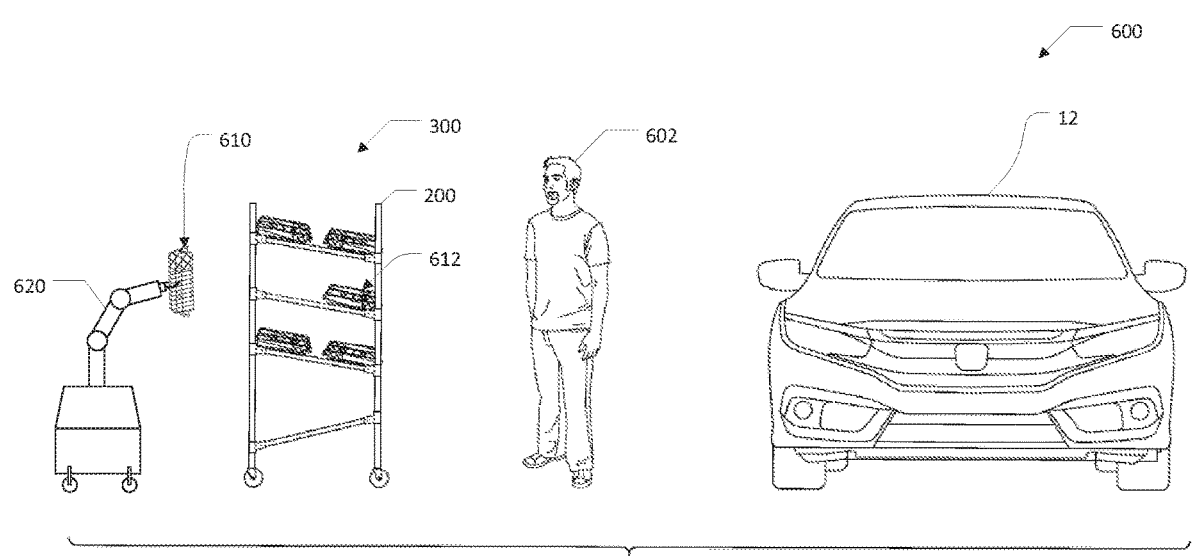

FIG. 6B illustrates another example of the service station 600 in which a service technician 602 is performing a maintenance task on a vehicle 12 and an automated service robot 620 refills and replaces the tote 610 on the supply rack 210. The automated service robot 620 may be in addition to or may replace the service facility worker 604 in various instances. In some examples, the automated service robot 620 may include an arm with multiple links and joints and a gripper for gripping items, such as the totes 610 and 612. In other examples, the automated service robot 620 may have other suitable configurations for retrieving empty totes 310 from a return rack 220, refilling the empty tote 310, and placing the refilled tote 310 on a supply rack 210.

In some examples, a service facility worker 604, service technician 602, or other person may trigger the automated service robot 620 to cause it to retrieve and refill totes 310, for example, by pressing a button. In other examples, the automated service robot 620 may be automatically activated. For instance, in examples in which the service rack 200 includes optical sensors as described above, the optical sensors may send a signal to the automated service robot 620 upon detecting a refill indicator 330, the signal activating the automated service robot 620.

In some instances, such as that illustrated in FIG. 6B, the automated service robot 620 may retrieve an empty tote 610 from a return rack 220, with its refill indicator 330 adjacent the back side of the return rack 220, and may then raise the empty tote 610 and place it on its respective supply rack 210 with its refill indicator 330 facing the front side of the supply rack 210. The automated service robot 620 may then refill the tote 610 with service items when the tote 610 is on the supply rack 210, in such instances. For example, the automated service robot 620 may obtain service items directly from a truck and place them in the tote 610 on the supply rack 210. In other instances, the automated service robot 620 may retrieve an empty tote 610 from a return rack 220 and transport it to another area in the service facility to refill the tote 610 with service items. For example, the automated service robot 620 may transport the tote 610 to an area by a truck containing service items and may refill the tote 610 with service items directly from the truck. The automated service robot 620 may then transport and place the refilled tote 610 on its respective supply rack 210.

Figure 7:
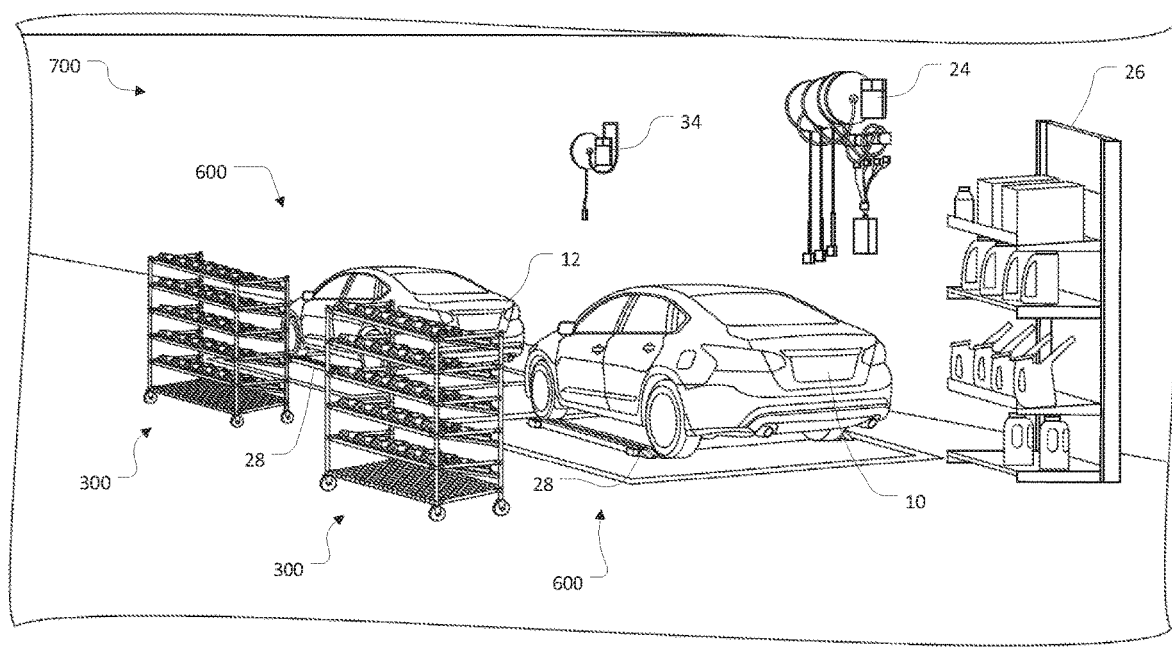
FIG. 7 illustrates a service facility according to an example of the present disclosure.

The service station 600 may be located in a service facility similar to the service facility 100. For example, FIG. 7 illustrates a service facility 700 including two service stations 600, each with a service rack system 300. The service facility 700 also includes the other components described in connection with the service facility 100. Accordingly, the service rack systems 300 can be used to enhance the station-based maintenance facilities discussed above, further improving service times and overall facility throughput as increasingly necessary to servicing vehicles and vehicle fleets.

Figure 8:
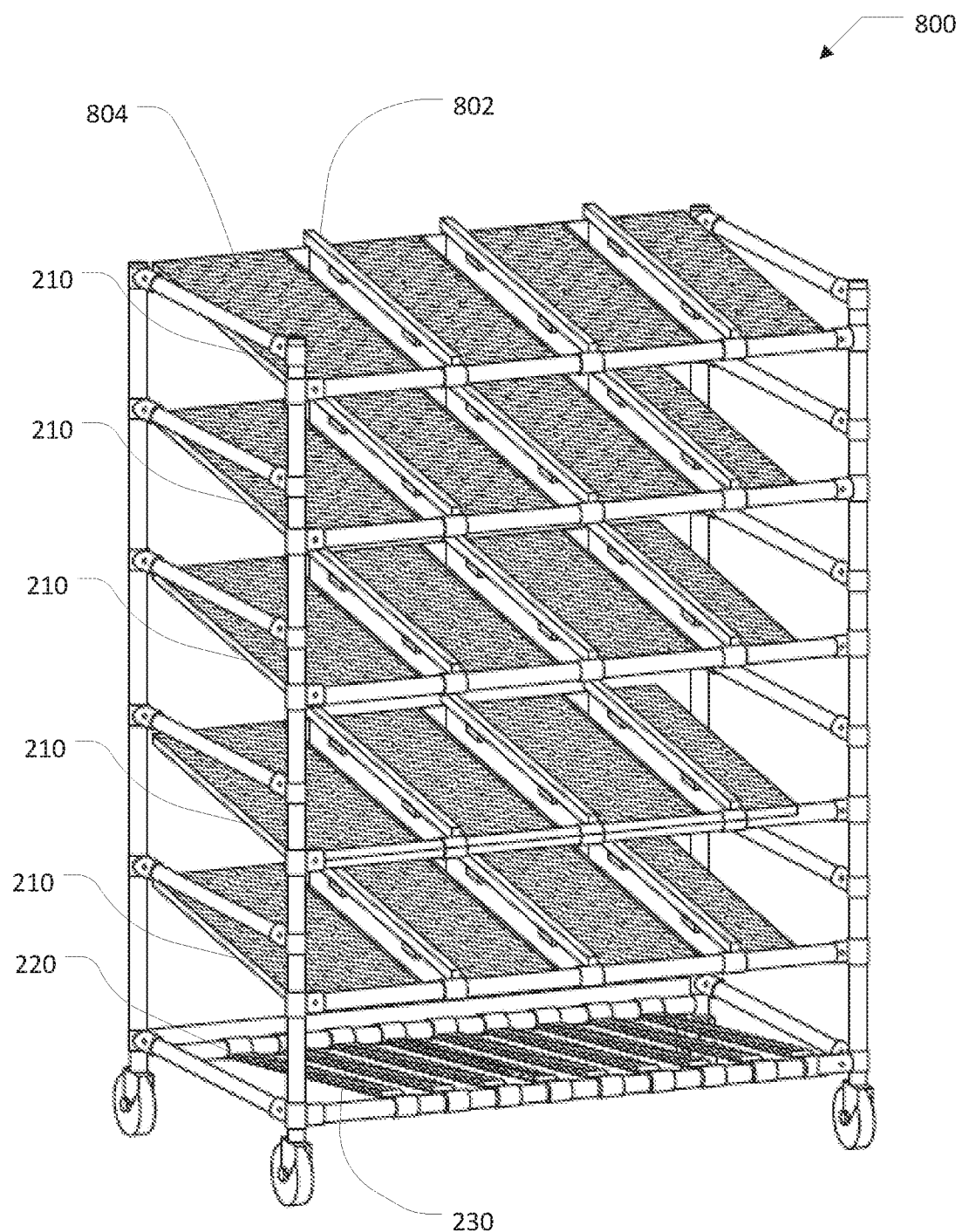
FIG. 8 illustrates a perspective view of a service rack with dividers according to an example of the present disclosure.

In addition to the above discussed and illustrated examples of the service rack 200, further examples may also be utilized. For example, FIG. 8 illustrates an example service rack 800 that includes dividers 802 on each of the supply racks 810. The dividers 802 may delineate each of the columns of totes 310, and accordingly may enhance the organization of the totes 310 on the supply racks 810. In some examples, the one or more return racks 820 may also have dividers 802. In addition, the supply racks 810 are illustrated as having a slick surface 804 (e.g., a surface having a low coefficient of friction) as described above. The return rack 820 is illustrated as having rollers 230. In other examples, the return rack 820 may also have a slick surface 804. In other examples, the supply racks 810 may have rollers 230 and the return rack may have a slick surface 804.

Figure 9:
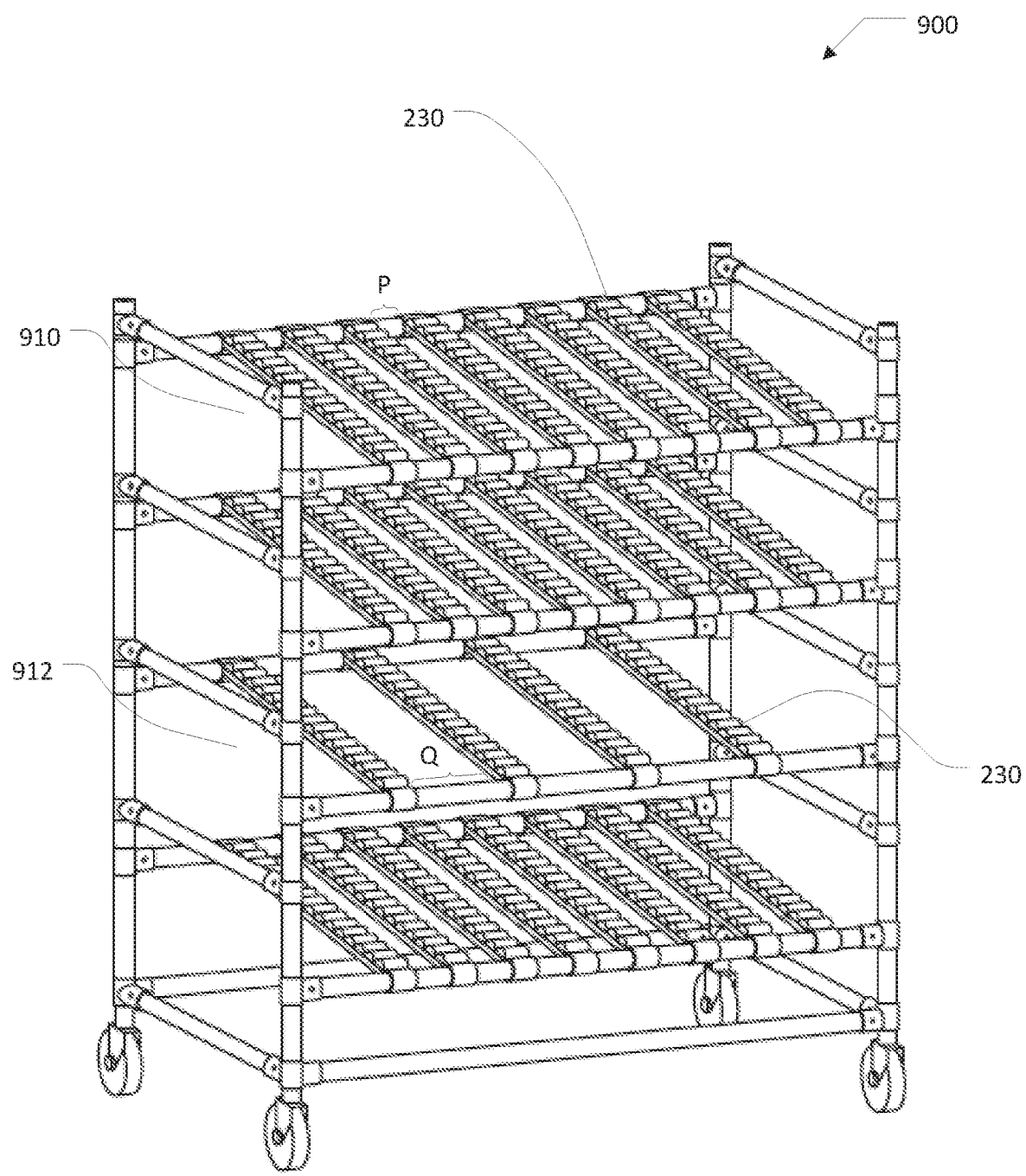
FIG. 9 illustrates a perspective view of a service rack with spaced apart rollers according to an example of the present disclosure.

FIG. 9 illustrates an example service rack 900 with adjustable rollers 230. For instance, the supply rack 910 is shown as having rollers 230 spaced apart with a gap P in between each individual strip of rollers 230. In comparison, the supply rack 912 is shown as having rollers 230 spaced apart with a gap Q in between each individual strip of rollers 230. In addition, the supply rack 910 has eight strips of rollers 230 whereas the supply rack 912 has four strips of rollers 230, thus indicating that in some instances the strips of rollers 230 may be removable. The adjustability of the rollers 230 may help reduce material costs for a service facility. For instance, larger totes 310 or other items may be larger than the gap Q and thus may move on two adjacent rollers 230 while remaining on the supply rack 912. A tote 310 or other item narrower than the gap Q would fall through the gap or would have to balance on one strip of rollers 230, thus such totes 310 or other smaller items require rollers 230 with narrower gaps in between, such as the gap P in the supply rack 910. Accordingly, for the larger items, fewer strips of rollers 230 are required and can be used elsewhere, such as other supply racks or other service racks, thus helping reduce material costs for the service facility.

Figure 10:
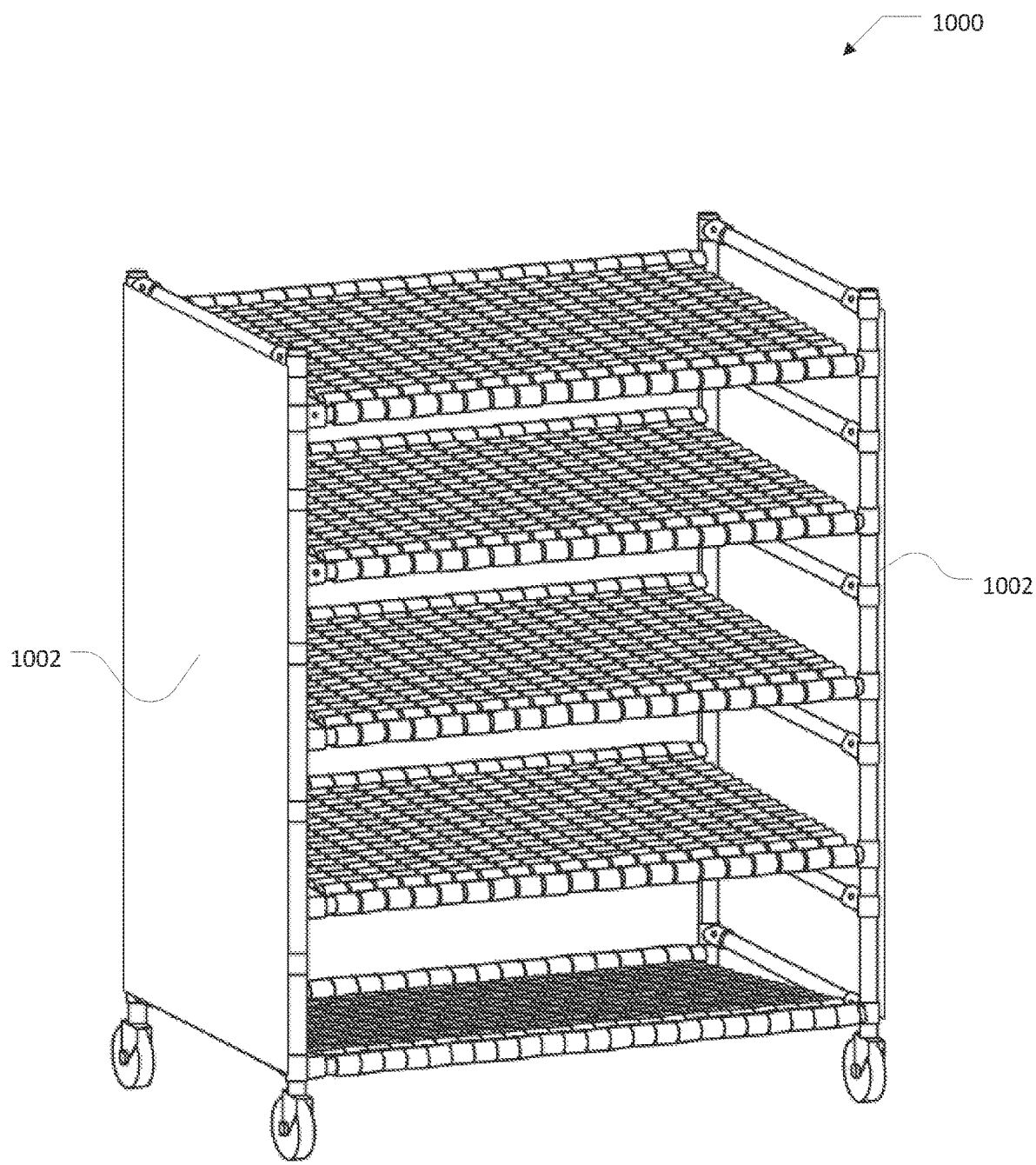
FIG. 10 illustrates a perspective view of a service rack with panels according to an example of the present disclosure.

FIG. 10 illustrates an example service rack 1000 with a panel 1002 on each of the left side and the right side of the service rack 1000. In some examples, each panel 1002 may be opaque and may be any color. In some examples, each panel 1002 may be a color that is different than a full indicator 320 color and a refill indicator 330 color in order to create contrast between the three colors. For instance, each panel 1002 may be white, while the full indicator 320 is blue and the refill indicator 330 is orange. The panels 1002 may prevent a line of sight to the totes 310 when viewing a service rack system 300 from the side. For instance, viewing a service rack system 300 without panels 1002 from the side (e.g., FIG. 6) results in seeing both the full indicators 320 and the refill indicators 330 of each of the totes 310 on the service rack 200. Conversely, viewing the service rack 1000 with panels 1002 from the side results in seeing only a panel 1002. Accordingly, the full indicators 320 and refill indicators 330 of the totes 310 on the service rack 1000 may only be viewed from the front or back of the service rack 1000. The effect of the panels 1002, therefore, is that those in the service facility will primarily only see a refill indicator 330 of a tote 310 if a tote 310 needs to be refilled, rather than sometimes seeing a refill indicator 330 from the side even though the service rack system 300 is full. As such, when a refill indicator 330 is visible, it will always indicate a problem with the respective service rack system 300 and service items that must be refilled. Efficiency may accordingly be improved.

Figure 11:
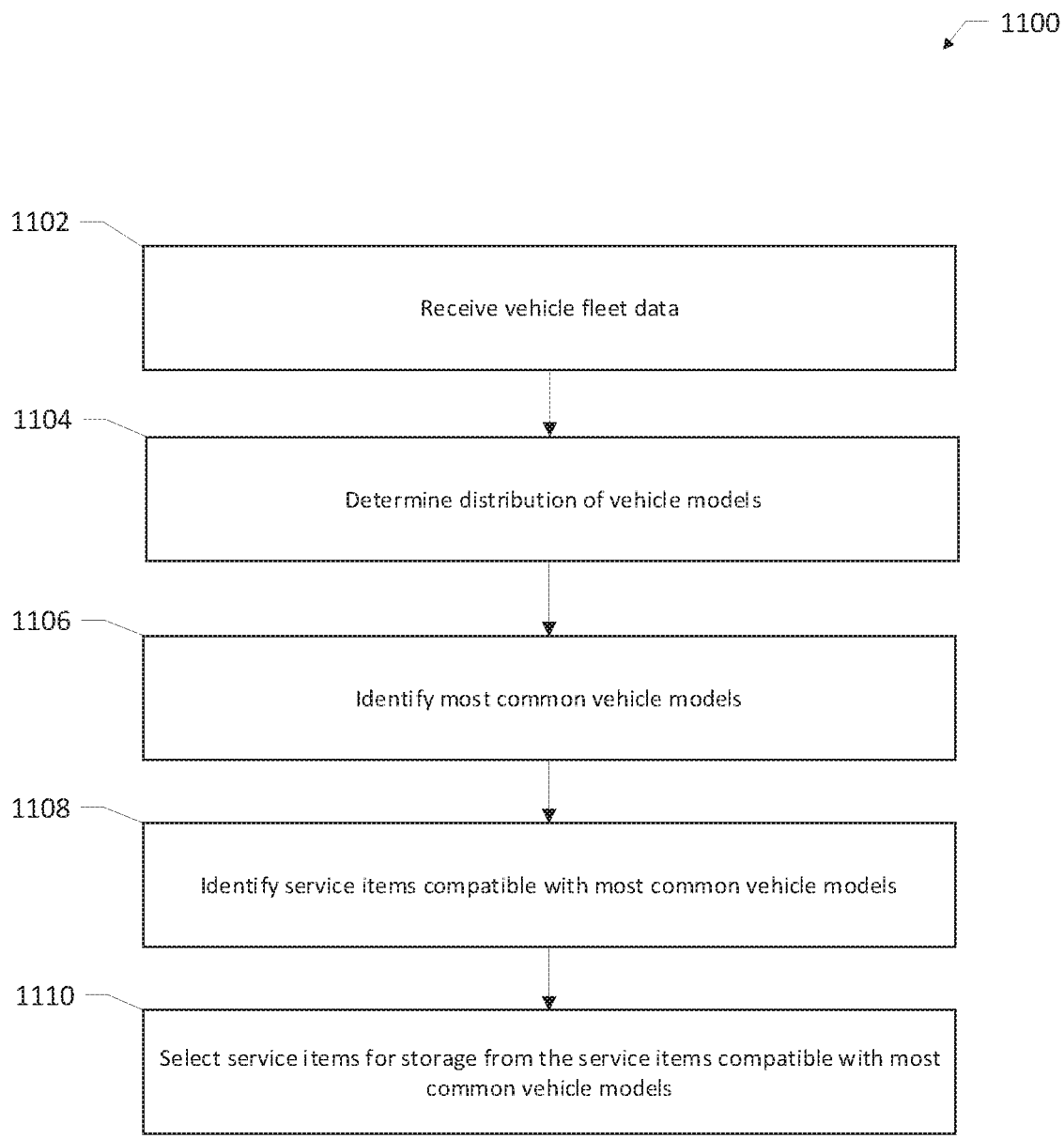
FIG. 11 depicts a method according to an exemplary embodiment of the present disclosure.

FIG. 11 depicts a method 1100 according to an exemplary embodiment of the present disclosure. The method 1100 may be performed to identify and select service items for storage within service racks 200, 800, 900, 1000. In particular, the method 1100 may be performed to select the service items stored in the totes 310, 402, 404, 406, 408, 500, 610, 612. The method 1100 may be implemented by a computer system, such as a computer system containing a processor and a memory. The method 1100 may also be implemented by a set of instructions stored on a computer-readable medium that, when executed by a processor, cause the computer system to perform the method. Although the examples below are described with reference to the flowchart illustrated in FIG. 11, many other methods of performing the acts associated with FIG. 11 may be combined with other blocks, one or more of the blocks may be repeated, and some of the blocks described may be optional.

The method 1100 begins with receiving vehicle fleet data (block 1102). The vehicle fleet data may specify the types of vehicles that operate in a given fleet (e.g., vehicles providing services in connection with a TNC). In particular, the vehicle fleet data may specify the make and model of vehicles operating in the vehicle fleet. Based on this data, a distribution of vehicle models may be determined (block 1104). For example, the vehicle fleet data may be analyzed to determine how many of each vehicle model operate in the vehicle fleet. In particular, the distribution of vehicle models may indicate a percentage of vehicles each vehicle model represents within the vehicle fleet. The most common vehicle models may then be identified (block 1106). For example, the most common vehicle models may be identified within the distribution of vehicle models. In certain implementations, the most common vehicle models may be selected as a predetermined number of most common vehicles (e.g., the 10, 20, or 50 most common vehicle models). In other implementations, the most common vehicle models may be selected to represent a certain percentage of vehicles in the vehicle fleet (e.g., the most common vehicle models that represent 50%, 75%, 90%, 95% of the vehicles in the vehicle fleet). In certain implementations, the vehicle fleet data may specify a year of manufacture for the vehicles in the vehicle fleet. In such instances, the distribution of vehicle models and the most common vehicle models may also specify the year of manufacture for their respective vehicle models.

Service items may then be identified that are compatible with the most common vehicle models (block 1108). For example, service item data may be analyzed that specifies which types of vehicle models the service items are compatible with. In certain instances, service items may be compatible with more than one type of vehicle or vehicle model. Similarly, in certain instances, certain vehicle models may be compatible with more than one of the same type of service item. The service items for storage may then be selected from among the service items that are compatible with the most common vehicle models (block 1110). For example, the service items may be selected to reduce the total number of individual types of service items, and therefore totes 310, 402, 404, 406, 408, 500, 610, 612, on the service racks 200, 800, 900, 1000. In particular, service items may be preferentially selected where possible that are compatible with more than one of the most common vehicle models. As another example, the service items may be selected to represent the most common maintenance tasks.

In particular, service items associated with common maintenance tasks (e.g., fluid changes, filter replacement) may be selected, while service items associated with less common maintenance tasks (e.g., vehicle body repairs) may not be selected.

Once selected, the service items may be stored on service racks 200, 800, 900, 1000 for use during vehicle maintenance operations as described above. By selecting the parts according to the method 1100, the total number of parts necessary for storage on the service racks 200, 800, 900, 1000 may be reduced, which may allow the service racks 200, 800, 900, 1000 to store additional parts (e.g., parts for more vehicle models and/or parts to service more types of vehicle maintenance tasks).

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated. The scope of the invention is therefore defined by the following claims.

The invention is claimed as follows:

1. A service rack system comprising:
    a service rack comprising:
        a front side, a back side, a right side, and a left side;
        a panel on each of the right side and the left side;
        at least one supply rack angled towards the front side; and
        at least one return rack angled towards the back side, wherein the front side is directly opposite the back side; and
    one or more totes each comprising at least a full indicator and a refill indicator,
        wherein the at least one supply rack is constructed to support one or more columns of totes, wherein each of the one or more columns includes at least two totes,
        wherein each column of totes is associated with at least one of a full state or a refill state, the full state comprising at least two totes positioned such that the full indicator of one tote faces the front side, and the refill state comprising one tote positioned such that its refill indicator is directly adjacent to the front side.

2. The system of claim 1, wherein the full indicator is a first color and the refill indicator is a second color different than the first color.

3. The system of claim 2, wherein the panel on each of the right side and the left side of the service rack is a third color different than the first color and the second color.

4. The system of claim 2, wherein the service rack further comprises an optical sensor configured to determine a color of a surface of the one or more totes facing the optical sensor.

5. The system of claim 4, wherein the optical sensor is further configured to cause the service rack to light up in response to detecting the second color.

6. The system of claim 1, wherein the full state comprises two totes, and wherein the totes are positioned such that the full indicator of a first tote faces the front side and the full indicator of a second tote faces the back side.

7. The system of claim 1, wherein the refill state of a column of totes comprises one tote remaining in the column of totes.

8. The system of claim 1, wherein the at least one return rack is constructed to support one or more columns of totes.

9. The system of claim 1, wherein the at least one supply rack and the at least one return rack comprise one or more adjustable rollers.

10. The system of claim 1, wherein the at least one supply rack or the at least one return rack comprises dividers separating each of the one or more columns.

11. The system of claim 1, wherein the at least one supply rack is angled to cause totes located on the at least one supply rack to move towards the front side and wherein the at least one return rack is angled to cause totes located on the at least one return rack to move towards the back side.

12. A service rack system comprising:
    a service rack comprising
        a front side, a back side, a right side, and a left side;
        at least one supply rack angled towards the front side, wherein the at least one supply rack comprises one or more adjustable rollers; and
        at least one return rack angled towards the back side, wherein the at least one return rack comprises one or more adjustable rollers, and wherein the front side is directly opposite the back side; and
    one or more totes each comprising at least a full indicator and a refill indicator,
        wherein the one or more totes are positioned on the at least one supply rack in one or more columns, wherein each of the one or more columns includes at least two totes, and
        wherein the totes in each column are positioned in one of a full state and a refill state, the full state comprising at least two totes positioned such that the full indicator of one tote faces the front side, and the refill state comprising one tote positioned such that its refill indicator is directly adjacent to the front side.

13. The service rack of claim 12, the service rack further comprising a panel on each of the right side and the left side of the service rack.

14. The system of claim 12, wherein the full indicator is a first color and the refill indicator is a second color different than the first color.

15. The system of claim 14, wherein the service rack further comprises an optical sensor configured to determine a color of a surface of the one or more totes facing the optical sensor.

16. The system of claim 15, wherein the optical sensor is further configured to cause the service rack to light up in response to detecting the second color.

17. The system of claim 12, wherein the full state comprises two totes, and wherein the totes are positioned such that the full indicator of a first tote faces the front side and the full indicator of a second tote faces the back side.

18. The system of claim 12, wherein the refill state of a column of totes comprises one tote remaining in the column of totes.

19. The service rack of claim 12, wherein the at least one supply rack or the at least one return rack comprises dividers separating each of the one or more columns.

20. The system of claim 12, wherein the at least one supply rack is angled to cause totes located on the at least one supply rack to move towards the front side and the at least one return rack is angled to cause totes located on the at least one return rack to move towards the back side.

\* \* \* \* \*